J. F. RITTENHOUSE.
HAND SEEDER.
APPLICATION FILED JUNE 28, 1911.
1,058,103.
Patented Apr. 8, 1913.
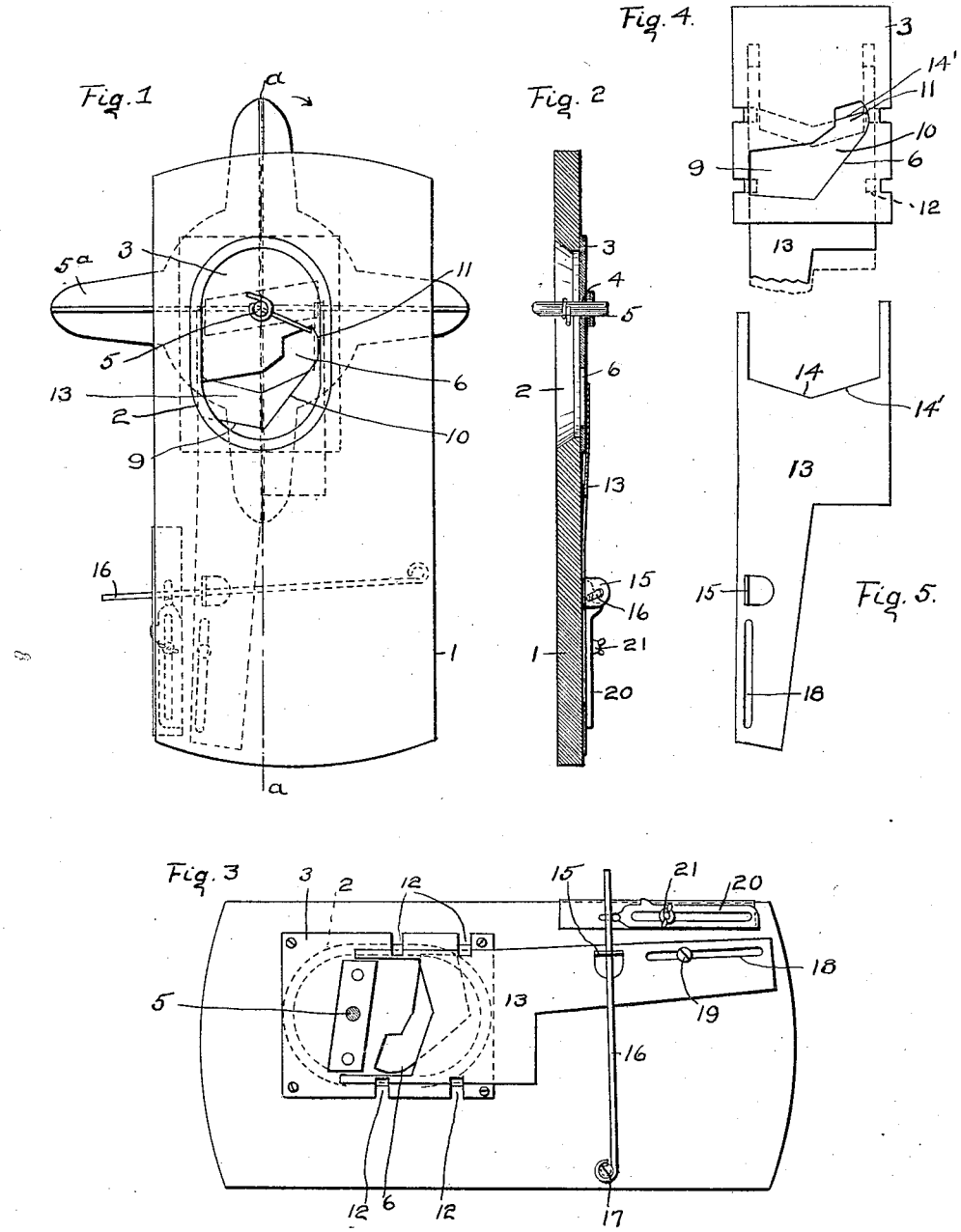
WITNESSES:
INVENTOR.
James F. Rittenhouse
BY Taylor & Hulse
ATTORNEYS

UNITED STATES PATENT OFFICE.

JAMES F. RITTENHOUSE, OF LIBERTY MILLS, INDIANA.

HAND-SEEDER.

1,058,103.     Specification of Letters Patent.     Patented Apr. 8, 1913.

Application filed June 28, 1911. Serial No. 635,856.

*To all whom it may concern:*

Be it known that I, JAMES F. RITTENHOUSE, a citizen of the United States, residing at Liberty Mills, in the county of Wabash and State of Indiana, have invented new and useful Improvements in Hand-Seeders, of which the following is a specification.

This invention relates to hand seeders and particularly to improvements in devices for controlling the feed of the seed onto the distributing wheel.

It is well known that the quantity of seeds to be sown in any given area varies with the nature of the seed. Timothy and clover seed are sown in small quantities, while wheat and oats are sown in large quantities. It is therefore important in hand seeders that there shall be provided suitable means for controlling the feed of the various seeds onto the rotating wheel, so that the same shall be properly distributed over the area to be sown. Heretofore it has been the usual practice to provide seeders of this class with openings which are regular in outline, as square, rectangular, circular, or fan-shaped, and which are disposed, relative to the wheel, in a radial direction from the axis of the wheel, the vertical plane of the radius of the wheel passing through the middle or center of the opening. Consequently the opening is equally divided on each side of said plane. The common position of the opening is in the rear of the rotating axis of the wheel—that is, between the axis of the wheel and the operator. A slide is arranged to coact with the opening, either by reciprocation, or rotation, by which the radial width of the opening is varied, to permit a greater or less quantity of seed to be delivered onto the wheel, which wheel is usually rotated clockwise. By the above construction and disposition of the opening only the radial width of the opening is varied by the slide. It is impossible by these constructions to vary the quantities of seed which shall be delivered to the wheel on opposite sides of the vertical radial plane above referred to. The seeds which are to be sown in small quantities are delivered to the wheel near its center, this being accomplished by adjusting the slide to expose the proper radial width of the opening for small seeds. The seed therefore moves with less speed and travels a greater distance to reach the discharge edge of the wheel than if it had been delivered to the wheel farther out from its center. If the opening has been properly located with reference to the wheel the small quantity of seed will be fairly evenly distributed by the wheel.

For the delivery onto the wheel of seeds which are to be sown in large quantities the slide is moved to increase the radial width of the opening thereby permitting a greater or lesser quantity of the seed to be delivered onto the wheel. Since the opening as now exposed is in a radial line with that exposed for the delivery of seeds in small quantities the only difference between the two is that the larger opening delivers a larger quantity of seed onto the wheel than the former, the bulk of which falls farther out from the center than in the former case and consequently moves rapidly at the start and travels a less distance on the wheel than the portion of such seeds as are delivered nearer the center of the wheel. The result is that the bulk of the seeds to be sown in large quantities is discharged too quickly from the wheel and falls to the left of the operator. The objection to the opening commonly in use then is that when once it is properly fixed so that one kind of seed shall be properly distributed the position of the opening relative to the wheel will not permit another kind of seed to be delivered to the wheel for proper distribution, and the object of my invention is to overcome these objections by providing a feed opening in a hand seeder so formed, positioned and controlled that seeds of various kinds may be evenly distributed in front of the operator as he travels over the ground.

Other objects will be hereinafter set forth.

My invention consists in providing a hand seeder with the novel form and arrangement of feed opening and controlling means hereinafter described and illustrated in the drawings, in which—

Figure 1 is a plan view of the bottom board of a hand seeder provided with my invention; Fig. 2, a section of Fig. 1 on line a—a; Fig. 3, a bottom view of Fig. 1; Fig. 4, a plan of the plate and controlling slide and Fig. 5, a plan of the slide.

Referring to the drawings, 1 is the board which forms the bottom of the seed holder, a suitable bag (not shown) being secured to the board in the usual manner. At a suitable point in the board, preferably adjacent its forward end, is provided the opening 2. This opening may be of any suitable shape. Secured to the bottom or lower side of board 1 and covering opening 2 is a plate 3, through an opening 4 in which projects the upper end of revoluble shaft 5, on which shaft and below the board a suitable distributing wheel 5ª is mounted. An opening 6 is provided in plate 3 which is exposed to opening 2, and which is adapted to permit the passage of the seed onto the distributing wheel 5ª. The position of opening 6 relative to wheel 5ª is such that the seed shall be delivered on more or less of the portion of the wheel in the rear of shaft 5—that is, the rear half of the wheel, the revolution of wheel 5ª being in the direction of the arrow and the top of Fig. 1 being considered as the forward end of the device. This opening is of peculiar form or shape. In general it is made up of a substantially rectangular portion 9 which is positioned farthest from the center of wheel 5ª and over the left side of the wheel; a contracted portion 10 extends from portion 9 forwardly and over the right side of wheel 5ª, the forward end of portion 10 terminating in a portion 11 which approaches closer to the center of the wheel than any other portion of opening 6 and which is much smaller in area than portion 9. There is therefore a feed opening having a portion over the right side of the wheel 5ª, the opening extending outwardly and rearwardly from said portion and gradually increasing in radial width until the plane of the vertical axis of wheel 5ª taken longitudinally of board 1 is reached, from which plane toward the left side of the wheel the opening is substantially rectangular in outline, and which portion has the greatest radial width of any portion of the opening and is farthest removed from the center of the wheel, the areas of the two portions on either side of the said plane being substantially equal and both portions being in the rear of the center of the wheel.

Beneath plate 3, and slidably mounted thereon by lugs 12 is a slide 13, the forward end of which is cut out as shown in Fig. 5. Lugs 12 are formed by cutting the same from plate 3 and bending them to engage over the slide. The rear edge 14 of this cut-out portion of slide 13 forms a wide obtuse angle within itself, the portion 14' of said edge being parallel to the forward side of portion 11 of opening 6 in plate 3.

A perforated lug 15 on slide 13 is slidably engaged by a rod 16 which is pivoted at one end 17 to board 1, the other end being free and serving as a handle by which the operator may move the slide to and fro on the plate and board. A slot 18 and screw 19 serve to retain the rear end of the slide on the board. A slotted bar or stop 20 is adjustably held on board 1 by thumb nut 21 and serves to adjustably limit the rearward movement of slide 13. It is now apparent that, starting with the slide closed on opening 6, as the slide is moved rearwardly portion 11 of opening 6 is first exposed to the wheel beneath it. As this portion is over the right side of the wheel and nearer its center than any other portion of the opening, seed will be delivered onto the right side of the wheel which will cause the seed to pass off the wheel in front of the operator and be distributed evenly over the ground. For seeds to be distributed in larger quantities the slide is drawn rearwardly to the desired point, thereby exposing more of opening 6. The additional portion of opening 6 which is thereby exposed is not in a radial line with that first exposed, but angles toward the longitudinal axis of the device which passes through the axis of the wheel. The seed is, therefore, delivered to the wheel not only near its center, but also farther out from that center and nearer the aforementioned longitudinal axis. The resultant distribution of the seed is the same as in the first case since the seed has a definite distance to travel on the wheel before it reaches the discharge edge. When the slide is opened to its fullest extent there is substantially an equal proportion of opening 6 on each side of the aforementioned longitudinal axis, but the portion on one side is nearer the axis of the wheel than the other; hence, the seed falling on the former portion has farther to travel on the wheel than that falling on the latter portion and is carried more to the right of the operator, while that falling on the left is discharged more to the left. An even distribution of the seed in front of the operator, therefore, is accomplished in all cases. The variety of seed being sown will govern the position in which the slide will be placed by the operator. There is therefore a wide range of control of feed of seeds upon the wheel 5ª.

What I claim is:

In a hand seeder, the combination of a bottom board having a feed opening, a distributer wheel below the board and beneath the feed opening, a plate covering the opening and having an opening exposed to the feed opening, said plate opening being substantially rectangular in its rear portion and over one side of the distributer wheel relatively to its axis, and a tapering extension to the opening which projects forwardly and laterally from the inner end of the rectangular portion of the opening and over the opposite side of said wheel relatively to its axis, and a slide carried by the plate and having a V-shaped edge adapted to coöperate with the irregular opening to cause seed to be delivered at various points on the wheel.

In witness whereof, I hereunto sign my name this 22" day of June, 1911.

JAMES F. RITTENHOUSE.

Witnesses:
 ALICE J. COOK,
 MICHAEL COOK.

Copies of this patent may be obtained for five cents each, by addressing the "Commissioner of Patents, Washington, D. C."